(12) United States Patent
Leske

(10) Patent No.: US 9,154,491 B1
(45) Date of Patent: Oct. 6, 2015

(54) TRUST MODELING

(71) Applicant: Google Inc., Mountain View, CA (US)

(72) Inventor: Matthew J. Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/081,091

(22) Filed: Nov. 15, 2013

(51) Int. Cl.
*G06F 7/04* (2006.01)
*H04L 29/06* (2006.01)

(52) U.S. Cl.
CPC ................................ *H04L 63/08* (2013.01)

(58) Field of Classification Search
USPC .......................................................... 726/4
See application file for complete search history.

(56) References Cited

U.S. PATENT DOCUMENTS

| | | |
|---|---|---|
| 8,359,225 B1 | 1/2013 | Seth |
| 8,402,548 B1 | 3/2013 | Muriello et al. |
| 8,490,206 B1 | 7/2013 | Fish |
| 2006/0206713 A1* | 9/2006 | Hickman et al. .............. 713/176 |
| 2008/0103907 A1* | 5/2008 | Maislos et al. .................. 705/14 |
| 2008/0288299 A1* | 11/2008 | Schultz ............................ 705/4 |
| 2012/0291137 A1* | 11/2012 | Walsh et al. .................... 726/26 |
| 2012/0297484 A1 | 11/2012 | Srivastava |
| 2013/0019289 A1* | 1/2013 | Gonser et al. ..................... 726/6 |
| 2013/0091540 A1* | 4/2013 | Chen et al. ........................ 726/1 |
| 2013/0091582 A1 | 4/2013 | Chen et al. |
| 2014/0196110 A1* | 7/2014 | Rubinstein et al. ............... 726/3 |

* cited by examiner

*Primary Examiner* — Amare F Tabor

(57) ABSTRACT

A method and computing system for establishing a broadcast account for a user of an internet-based broadcasting system. An initial trust level is assigned to the broadcast account. The initial trust level is chosen from a plurality of predefined trust levels. A trust score is determined for the broadcast account. The trust score is based, at least in part, upon one or more activities of the user. The initial trust level is adjusted based, at least in art, upon the trust score.

20 Claims, 4 Drawing Sheets

TRUST MODELING

TECHNICAL FIELD

This disclosure relates to trust modeling and, more particularly, to trust modeling concerning broadcast content.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

The Internet also provides users with the ability to broadcast (e.g., stream) live video/audio to a wide audience. Traditionally, this ability was licensed to only a limited number of broadcasters (e.g., media/broadcast companies). With this enhanced ability to broadcast comes a measure of risk to the technology provider with respect to claims of abusive use and copyright violations.

SUMMARY OF DISCLOSURE

In one implementation, a computer-implemented method includes establishing a broadcast account for a user of an internet-based broadcasting system. The internet-based broadcasting system is a portion of/included within a social network. An initial trust level is assigned to the broadcast account. The initial trust level is chosen from a plurality of predefined trust levels. A trust score is determined for the broadcast account. The trust score is based, at least in part, upon one or more activities of the user. The initial trust level is adjusted based, at least in art, upon the trust score. Adjusting the initial trust level includes: incrementing the initial trust level to a higher predefined trust level, chosen from a plurality of predefined trust levels, in response to a positive trust score, and decrementing the initial trust level to a lower predefined trust level, chosen from a plurality of predefined trust levels, in response to a negative trust score.

In another implementation, a computer-implemented method includes establishing a broadcast account for a user of an internet-based broadcasting system. An initial trust level is assigned to the broadcast account. The initial trust level is chosen from a plurality of predefined trust levels. A trust score is determined for the broadcast account. The trust score is based, at least in part, upon one or more activities of the user. The initial trust level is adjusted based, at least in art, upon the trust score.

One or more of the following features may be included. Establishing a broadcast account may include requiring the user to confirm their identify. Requiring the user to confirm their identity may include confirming the identity of the user via bidirectional SMS communication. Determining a trust score for the broadcast account may include monitoring content broadcast by the user to determine the trust score. Monitoring content broadcast by the user to determine the trust score may include identifying copyright-infringing content included within the content broadcast by the user by comparing copyrighted content to the content broadcast by the user. Monitoring content broadcast by the user to determine the trust score may include identifying abusive content included within the content broadcast by the user. Adjusting the initial trust level may include incrementing the initial trust level to a higher predefined trust level, chosen from a plurality of predefined trust levels, in response to a positive trust score. Adjusting the initial trust level may include decrementing the initial trust level to a lower predefined trust level, chosen from a plurality of predefined trust levels, in response to a negative trust score. The one or more activities of the user may include one or more activities of the user within a social network. The internet-based broadcasting system may be a portion of/included within a social network.

In another implementation, a computing system including a processor and memory is configured to perform operations including establishing a broadcast account for a user of an internet-based broadcasting system. An initial trust level is assigned to the broadcast account. The initial trust level is chosen from a plurality of predefined trust levels. A trust score is determined for the broadcast account. The trust score is based, at least in part, upon one or more activities of the user. The initial trust level is adjusted based, at least in art, upon the trust score.

One or more of the following features may be included. Establishing a broadcast account may include requiring the user to confirm their identify. Requiring the user to confirm their identity may include confirming the identity of the user via bidirectional SMS communication. Determining a trust score for the broadcast account may include monitoring content broadcast by the user to determine the trust score. Monitoring content broadcast by the user to determine the trust score may include identifying copyright-infringing content included within the content broadcast by the user by comparing copyrighted content to the content broadcast by the user. Monitoring content broadcast by the user to determine the trust score may include identifying abusive content included within the content broadcast by the user. Adjusting the initial trust level may include incrementing the initial trust level to a higher predefined trust level, chosen from a plurality of predefined trust levels, in response to a positive trust score. Adjusting the initial trust level may include decrementing the initial trust level to a lower predefined trust level, chosen from a plurality of predefined trust levels, in response to a negative trust score. The one or more activities of the user may include one or more activities of the user within a social network. The internet-based broadcasting system may be a portion of/included within a social network.

The details of one or more implementations are set forth in the accompanying drawings and the description below. Other features and advantages will become apparent from the description, the drawings, and the claims.

DETAILED DESCRIPTION OF THE PREFERRED EMBODIMENTS

System Overview

Figure 1:
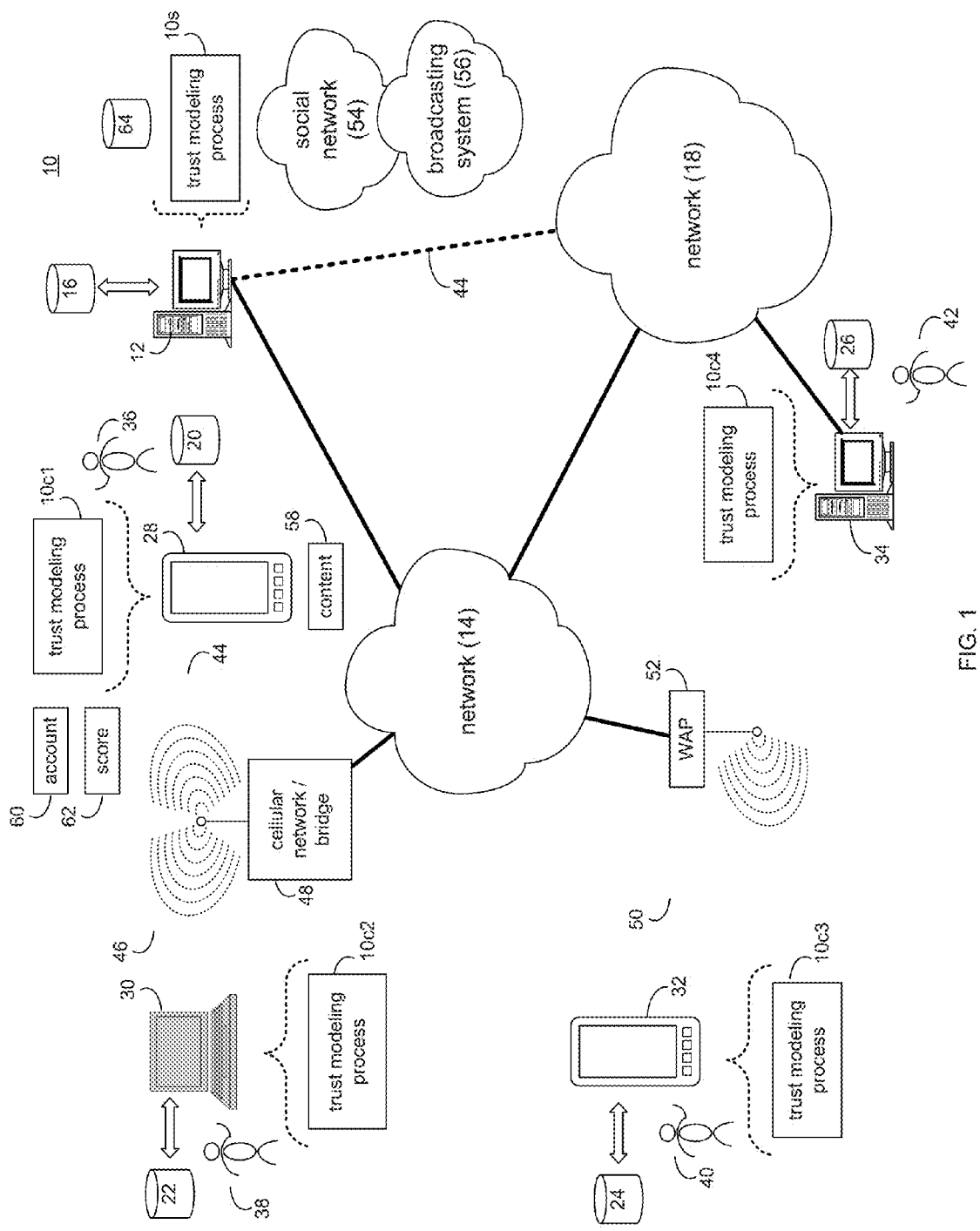
FIG. 1 is a diagrammatic view of a distributed computing network including a computing device that executes a trust modeling process according to an embodiment of the present disclosure.
Figure 2:
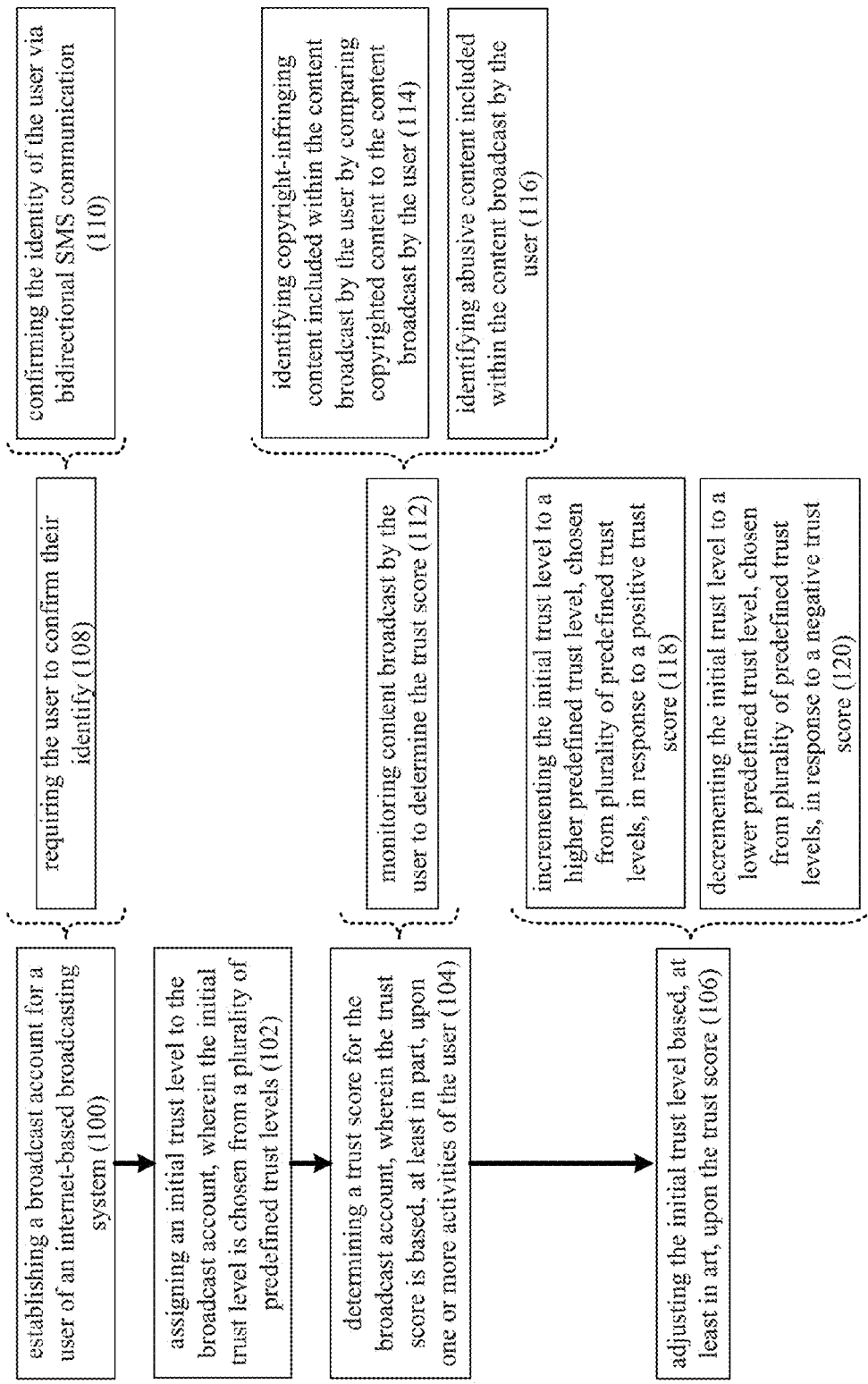
FIG. 2 is a flowchart of the trust modeling process of FIG. 1 according to an embodiment of the present disclosure.

In FIGS. 1 & 2, there is shown trust modeling process 10. Trust modeling process 10 may be implemented as a server-side process, a client-side process, or a hybrid server-side/client-side process. For example, trust modeling process 10 may be implemented as a purely server-side process via trust modeling process 10s. Alternatively, trust modeling process 10 may be implemented as a purely client-side process via one or more of trust modeling process 10c1, trust modeling process 10c2, trust modeling process 10c3, and trust modeling process 10c4. Alternatively still, trust modeling process 10 may be implemented as a hybrid server-side/client-side process via trust modeling process 10s in combination with one or more of trust modeling process 10c1, trust modeling process 10c2, trust modeling process 10c3, and trust modeling process 10c4. Accordingly, trust modeling process 10 as used in this disclosure may include any combination of trust modeling process 10s, trust modeling process 10c1, trust modeling process 10c2, trust modeling process 10c3, and trust modeling process 10c4.

As will be discussed below in greater detail, trust modeling process 10 may establish 100 a broadcast account for a user of an internet-based broadcasting system and may assign 102 an initial trust level to the broadcast account. The initial trust level may be chosen from a plurality of predefined trust levels. A trust score may be determined 104 for the broadcast account. The trust score may be based, at least in part, upon one or more activities of the user. Trust modeling process 10 may adjust 106 the initial trust level based, at least in art, upon the trust score.

Trust modeling process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of trust modeling process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of trust modeling processes 10c1, 10c2, 10c3, 10c4 may include but are not limited to a web browser, a game console user interface, a social network user interface, a video conference user interface, or a specialized application. The instruction sets and subroutines of trust modeling processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a tablet computer (not shown), a notebook computer (not shown), a server computer (not shown), a gaming console (not shown), and a dedicated network device (not shown). Client electronic devices 28, 30, 32, 34 may each execute an operating system.

Users 36, 38, 40, 42 may access trust modeling process 10 directly through network 14 or through secondary network 18. Further, trust modeling process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Trust Modeling Process

Trust modeling process 10 may be included within, executed within, or a portion of a social network (e.g., social network 54). Alternatively, trust modeling process 10 may be included within, executed within, or a portion of Internet-based broadcasting system 56. Further, trust modeling process 10 may be a stand-alone application that is configured to interface with social network 54 and/or Internet-based broadcasting system 56. Additionally, Internet-based broadcasting system 56 may be included within, executed within, or a portion of social network 54.

As discussed above, trust modeling process 10 may establish 100 a broadcast account for a user of internet-based broadcasting system 56 and may assign 102 an initial trust level to the broadcast account. The initial trust level may be chosen from a plurality of predefined trust levels. A trust score may be determined 104 for the broadcast account. This trust score may be based, at least in part, upon one or more activities of the user. Trust modeling process 10 may adjust 106 the initial trust level based, at least in art, upon the trust score.

For example, assume that user 36 would like to broadcast content (e.g., content 58) on network 14. Accordingly and prior to being able to broadcast content 58, user 36 may utilize trust modeling process 10 to establish 100 a broadcast account (e.g., broadcast account 60) for user 36 of internet-based broadcasting system 56.

When establishing 100 broadcast account 60 for user 36, trust modeling process 10 may require 108 user 36 to confirm their identify. Trust modeling process 10 may utilize such a procedure to prevent the automated generation of broadcast accounts. For example, when requiring 108 that user 36 confirm their identity, trust modeling process 10 may confirm 110 the identity of user 36 via bidirectional SMS communication. For example, when establishing 100 broadcast account 60 for user 36, trust modeling process 10 may require 108 that user 36 confirm their identity by e.g., providing a telephone number that is capable of receiving text messages. Once user 36 provides to trust modeling process 10 the information required to establish broadcast account 60 (including this telephone number), trust modeling process 10 may send a SMS text message to the telephone number identified by user 36. User 36 may then be required to respond to this text message, thus confirming 110 their identity to trust modeling process 10.

Once broadcast account 60 has been established 100 for user 36, trust modeling process 10 may assign 102 an initial trust level to broadcast account 60, wherein this initial trust level may be chosen from a plurality of predefined trust levels. Examples of these trust levels may include: a) Untrusted; b) Probation; c) Unknown; d) Basic (default); e) Full access; and f) Advanced. As will be discussed below in greater detail, each of the above-described trust levels may be configured to grant to the user (e.g., user 36) a different level of broadcast rights/privileges.

When a new broadcast account (e.g., broadcast account 60) is established 100 for a user (e.g., user 36), the initial trust level assigned to the broadcast account may be "Unknown", as they have just signed up for the account and have no significant historic/social information upon which trustworthiness may be based. Accordingly, by assigning the new account (e.g., broadcast account 60) with an initial trust level of "Unknown", the user (e.g., user 36) may not be restricted from using broadcasting system 56. However, user 36 may be required to prove some level of trust to advance to a higher trust level. Typically, only new users are placed into the "Unknown" trust level. Therefore, users are typically not "downgraded" into the "Unknown" trust level.

Trust modeling process 10 may determine 104 a trust score (e.g., trust score 62) for broadcast account 60, wherein trust score 62 may be based (at least in part) upon one or more activities of user 36. Examples of these activities of user 36 may include one or more activities of user 36 within social network 54.

Examples of such activities (within social network 54) that may be used by trust modeling process 10 (to determine 104 trust score 62 for broadcast account 60) and may be indicative of positive trust may include but are not limited to:
  the length of time that user 36 had an account with social network 54;
  the number of friends that user 36 has within social network 54;
  if user 36 has a "channel" within social network 54, the number of people subscribed to this "channel";
  the number of broadcasts/transmissions that user 36 has made within this "channel" without incident (to be discussed below in greater details);
  the number of followers that user 36 has within social network 54;
  the number of posts that user 36 has made within social network 54;
  the number of people that have indicated that they like user 36 within social network 54; and
  the number of people that user 36 has indicated that they like within social network 54.

Examples of such activities (within social network 54) that may be used by trust modeling process 10 (to determine 104 trust score 62 for broadcast account 60) and may be indicative of negative trust may include but are not limited to:
  indications that user 36 has posted abusive content within social network 54;
  indications that user 36 has violated copyright (e.g., posted/broadcasted/streamed copyrighted content) within social network 54; and
  indications that user 36 has been blocked by other users of social network 54.

When determining 104 trust score 62 for broadcast account 60, trust modeling process 10 may monitor 112 the content broadcast (e.g., content 58) by user 36 to determine (at least in part) trust score 62.

Monitoring 112 the content (e.g., content 58) broadcast by user 36 to determine trust score 62 may include identifying 114 copyright-infringing content included within the content (e.g., content 58) broadcast by user 36 by comparing copyrighted content (e.g., copyrighted content 64) to the content (e.g., content 58) broadcast by user 36. Copyrighted content 64 may be defined within a content database (not shown) accessible by trust modeling process 10. For example, as content 58 is broadcast by user 36, this content (be it audio content, video content, or audio/video content) may be compared to copyrighted content 64 to determine if matches occur. Accordingly, if broadcast content 58 includes copyrighted audio (such as a copyrighted song) being broadcast in the background, trust modeling content 10 may identify 114 that broadcast content 58 includes copyrighted content and, therefore, record this incident as a copyright violation. Further, if broadcast content 58 includes copyrighted video (such as a copyrighted movie) being broadcast, trust modeling content 10 may identify 114 that broadcast content 58 includes copyrighted content and, therefore, record this incident as a copyright violation. The occurrence of such copyright violation event(s) may be utilized by trust modeling process 10 to determine 104 trust score 62 for broadcast account 60.

Monitoring 112 content (e.g., content 58) broadcast by user 36 to determine trust score 62 may include identifying 116 abusive content included within the content (e.g., content 58) broadcast by user 36. For example, if broadcast content 58 includes abusive content (such as profane/racist content) and this content is subsequently reported to social network 54 and/or trust modeling process 10, social network 54 and/or trust modeling process 10 may investigate the same (by algorithm and/or human review) to determine the voracity of this abusive content claim. In the event that such claim is determined to be valid, trust modeling process 10 may record this abusive content event to identify 116 the same; wherein the occurrence of such abusive content event(s) may be utilized by trust modeling process 10 to determine 104 trust score 62 for broadcast account 60

As discussed above, trust modeling process 10 may determine 104 a trust score (e.g., trust score 62) for broadcast account 60, wherein trust score 62 may be based (at least in part) upon one or more activities of user 36 (such as the activities of user 36 within social network 54.

Trust modeling process 10 may determine trust score 62 algorithmically. One example of such a trust score algorithm includes but is not limited to:

Trust Score 62=(a1)Ltime+(a2)Nfriends+(a3)Nfollowers+(a4)Nposts+(a5)Nlo+(a6)Nli+(a7)Aviolations+(a8)Cviolations+(a9)Nblocks wherein Ltime is the length of time that user 36 had an account with social network 54; Nfriends is the number of friends that user 36 has within social network 54; Nfollowers is the number of followers that user 36 has within social network 54; Nposts is the number of posts that user 36 has made within social network 54: Nlo is the number of people that user 36 has indicated that they like within social network 54; Nli is the number of people that have indicated that they like user 36 within social network 54; Aviolations is the number of indications that user 36 has posted/broadcasted/streamed abusive content within social network 54 (may be a decaying indicator); Cviolations is the number of indications that user 36 has violated copyright (e.g., posted/broadcasted/streamed copyrighted content) within social network 54 (may be a decaying indicator); Nblocks is the number of indications that user 36 has been blocked by other users of social network 54; and a1-a9 may be weighting coefficients.

Trust modeling process 10 may adjust 106 the initial trust level (e.g., "Unknown") based, at least in art, upon trust score 62. When adjusting 106 the initial trust level (e.g., "Unknown"), trust modeling process 10 may increment 118 the initial trust level (e.g., "Unknown") to a higher predefined trust level (chosen from the plurality of predefined trust levels) in response to a positive trust score. Conversely, when adjusting 106 the initial trust level (e.g., "Unknown"), trust modeling process 10 may decrement 120 the initial trust level (e.g., "Unknown") to a lower predefined trust level (chosen from the plurality of predefined trust levels) in response to a negative trust score.

Figure 3:
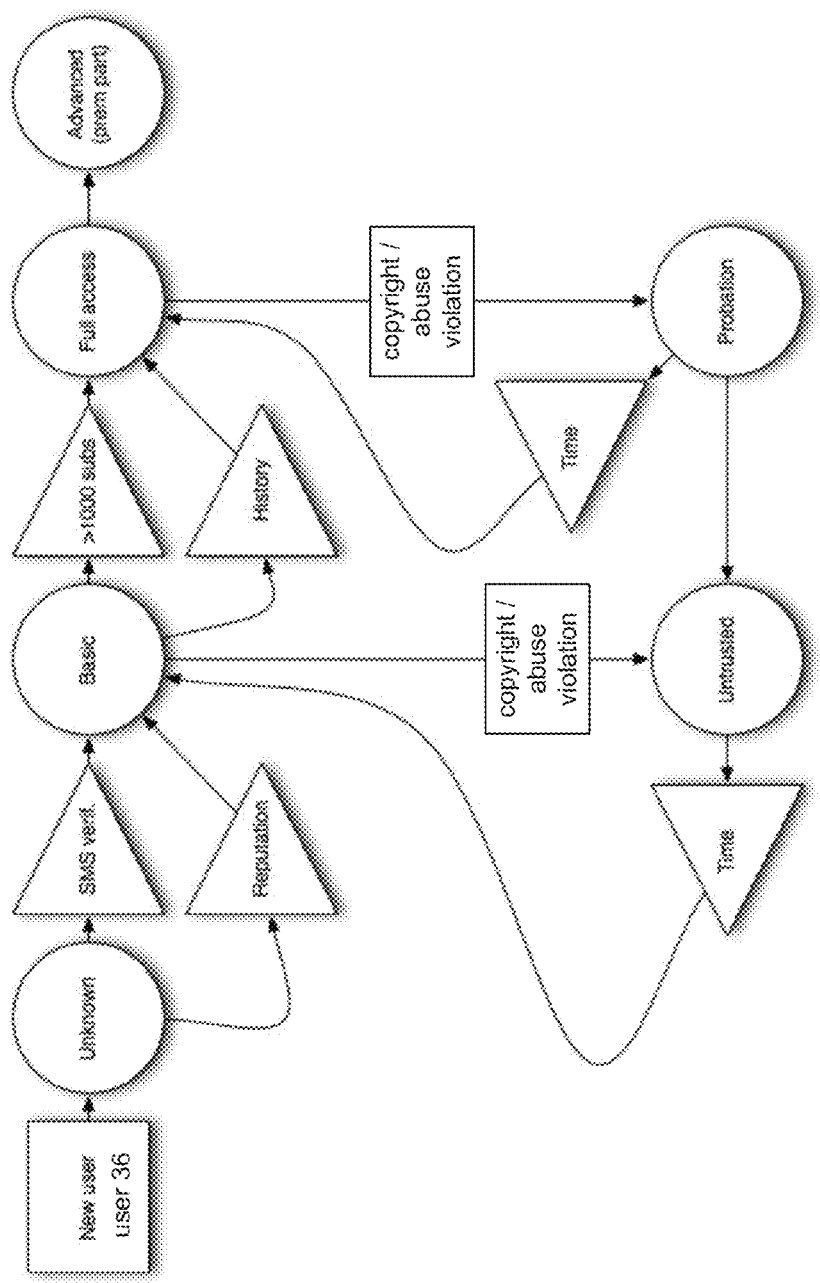
FIG. 3 is a diagrammatic view of the manner in which the trust modeling process of FIG. 1 may assign trust levels according to an embodiment of the present disclosure.

Referring also to FIG. 3 and as discussed above, once broadcast account 60 has been established 100 for user 36, trust modeling process 10 may assign 102 an initial trust level to broadcast account 60 of "Unknown".

Unknown Trust Level

For a brand new user (e.g., user 36), they are placed into a trust category of "Unknown". User 36 may have just signed up for a new account (e.g., broadcast account 60) and there may be no significant historic or social information about user 36. While trust modeling process 10 will not totally restrict user 36 from using broadcasting system 56, user 36 may need to prove some level of trust to have access to a higher level of privileges within broadcasting system 56.

Migrating from Unknown Trust Level to Basic Trust Level

New users may be required to agree to the terms and conditions of broadcasting system 56 and may need to verify their account using a third party mechanism (such as SMS verification). This third party mechanism may have two objectives a) to ensure user 36 is a real person and not a robot and b) to ensure that user 36 may not be scaling abuse of broadcasting system 56. Trust modeling process 10 may consider various items/indicators when establishing an account for a user. For example, trust modeling process 10 may consider the reputation of user 36 when setting up an account for user 36. Further, in the event that a user has a sufficient reputation, that user may bypass the above-described SMS verification step. For example, assume that user 36 is a long-standing user of a product similar but unrelated to broadcasting system 56. If trust modeling process 10 has access to the data concerning the reputation of user 36 with respect to this similar but unrelated product, trust modeling process 10 may allow user 36 to establish a Basic trust level without SMS verification. Further, in the event that user 36 wishes to use SMS verification in conjunction with their reputation, trust modeling process 10 may allow user 36 to establish a Full Access trust level.

Each user may be required to have a small number of accounts (less than five). User 36 may move from Unknown to the Basic trust level by having a social graph (within social network 54) that may be trusted. This level of trust may be intrinsic and may be repeatedly adjusted. For example, if user 36 has been active within social network 54 for two years, has fifty friends, and has had activity over that time period; user 36 may be assumed to be a trusted person (as opposed to an unknown person) and trust modeling process 10 may grant user 36 the Basic trust level.

Basic access to broadcasting system 56 may grant user 36 access to the basic product feature set of broadcasting system 56, but user 36 may have very limited tolerance for any abuse (e.g., copyright violations and/or abuse violations). The Basic product feature set of broadcasting system 56 may include: full unlimited public broadcasting; private broadcasting to groups of less than one hundred people; and high definition broadcasting.

Migrating from Basic Trust Level to Untrusted Trust Level

In the event of abuse (e.g., copyright violations and/or abuse violations), a Basic trust level user may instantly lose access to the live streaming feature. In the event of such a situation, user 36 may have the ability to appeal the decision (e.g., an inaccurate copyright violation) or may wait for a defined period of time (e.g., three months) until the copyright violations and/or abuse violations expires. During this time period, user 36 may not host a live broadcast.

Migrating from Basic Trust to Full Access Trust Level

User 36 may move from Basic trust level to Full Access trust level through one of two processes. For example, if user 36 has more than one thousand "channel" subscribers within social network 54 or more than one hundred friends within social network 54; trust modeling process 10 may upgrade user 36 from Basic trust level to Full Access trust level. Alternatively/additionally, if user 36 has a long history of successful broadcasts, trust modeling process 10 may upgrade user 36 from Basic trust level to Full Access trust level. For example, user 36 may not have any records of violations during the past twelve months and may have performed at least one broadcast per week during that period. Full Access trust level may give user 36 more leniency towards accidental content (e.g., copyright/abuse) violations; and may offer private (and unlisted) video streams redundancy for live video streams.

Migrating from Full Access Trust Level to Probation

As mentioned above, one benefit of full access is some additional leniency for copyright/abuse violations. Since accidental abuse may harm a live broadcast (and the viewer experience), if abuse is detected by trust modeling process 10, trust modeling process 10 may change a Full Access trust level to a probation state, wherein user 36 may continue to have access to the same features as the Full Access trust level (but with only one violation remaining). For example, if copyrighted music was detected in a live broadcast by user 36, that broadcast may be ended by trust modeling process 10 and user 36 may be transitioned from Full Access trust level to probation. Accordingly, if user 36 has any other copyright/abuse violations during their probationary state (e.g., three months), user 36 may lose access and move to the Untrusted trust level. However, if user 36 does not have any additional violations during this probationary state (e.g., three months), user 36 may be transitioned by trust modeling process 10 from probation to Full Access trust level.

Migrating from Full Access to Advanced

Advanced access may build upon the Full Access trust level and may represent the most trusted users within broadcasting system 56 and may add the following capability, such as: disabled automated content filtering. Trust modeling process 10 may require that user 36 execute a legal agreement specifying that they have full content rights to all of the content broadcast by user 36 (thus not requiring filtering by trust modeling process 10).

General

Figure 4:
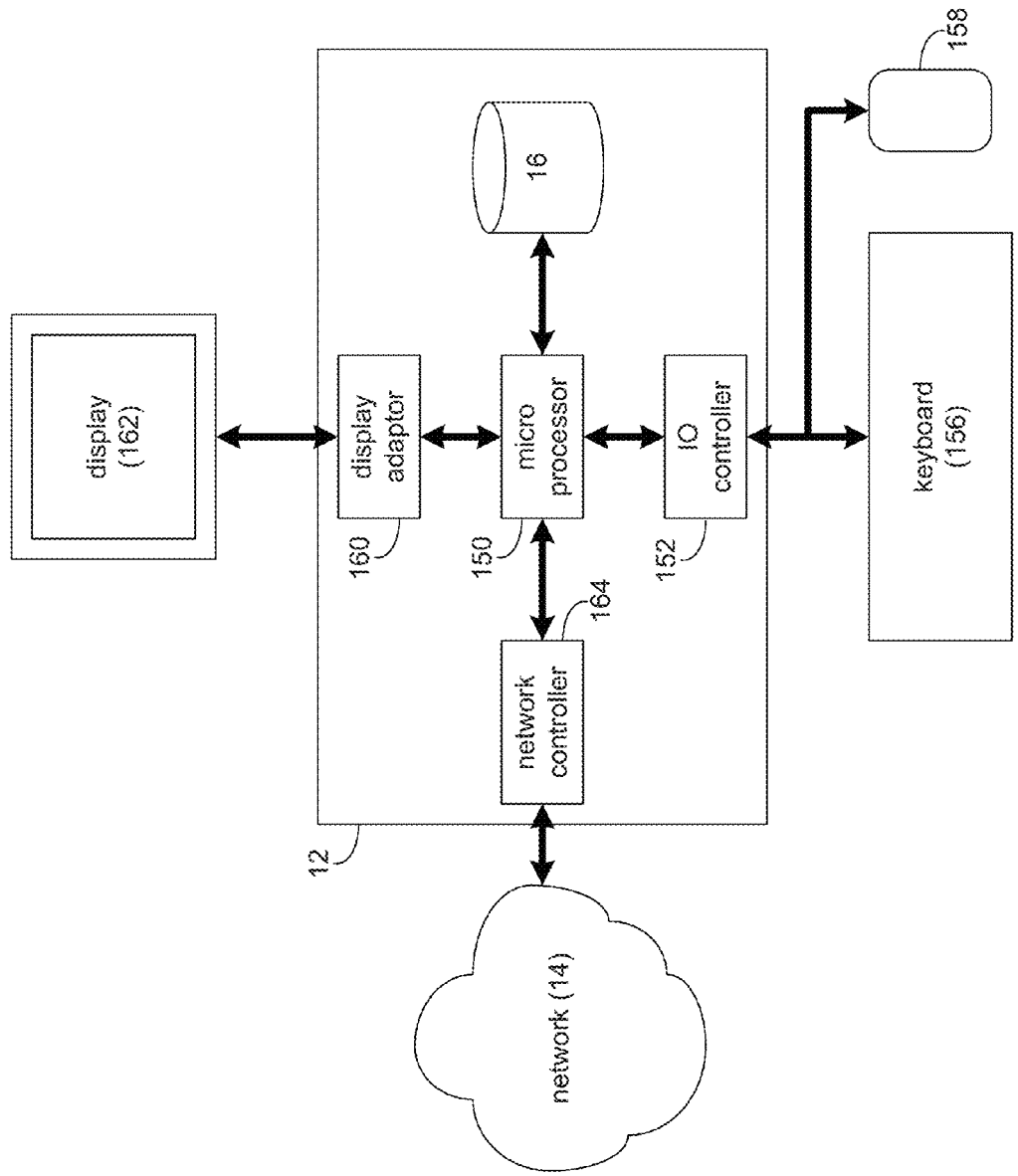
FIG. 4 is a diagrammatic view of the computing device of FIG. 1 according to an embodiment of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, trust modeling process 10 may be substituted for computing device 12 within FIG. 4, examples of which may include but are not limited to client electronic devices 28, 30, 32, 34.

Computing system 12 may include microprocessor 150 configured to e.g., process data and execute instructions/code for trust modeling process 10. Microprocessor 150 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 152 may be configured to couple microprocessor 150 with various devices, such as keyboard 156, mouse 158, USB ports (not shown), and printer ports (not shown). Display adaptor 160 may be configured to couple display 162 (e.g., a CRT or LCD monitor) with microprocessor 150, while network adapter 164 (e.g., an Ethernet adapter) may be configured to couple microprocessor 150 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 150) of a general purpose computer/special purpose computer/other programmable data processing apparatus (e.g., computing device 12), such that the instructions, which execute via the processor (e.g., processor 150) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A non-transitory computer-readable medium with an executable program stored thereon, wherein the program instructs a processor to perform operations comprising:
   establishing a broadcast account for a user of an internet-based broadcasting system, wherein the internet-based broadcasting system is a portion of/included within a social network;
   assigning an initial trust level to the broadcast account, wherein the initial trust level is chosen from a plurality of predefined trust levels, the predefined trust levels including a trust level associated with restricted broadcast privileges and a trust level associated with full broadcast privileges;
   determining a trust score for the broadcast account, wherein the trust score is based, at least in part, upon monitoring content broadcast by the user to identify copyright-infringing content included within the content broadcast by the user by comparing copyrighted content to the content broadcast by the user and one or more activities of the user, the one or more activities including a number of broadcasts that the user has made; and
   adjusting the initial trust level based, at least in part, upon the trust score, wherein adjusting the initial trust level includes:
      incrementing the initial trust level to a higher predefined trust level, chosen from a plurality of predefined trust levels, in response to a positive trust score, and
      decrementing the initial trust level to a lower predefined trust level, chosen from a plurality of predefined trust levels, in response to a negative trust score.

2. A computer-implemented method comprising:
   establishing a broadcast account for a user of an internet-based broadcasting system, wherein the internet-based broadcasting system is a portion of/included within a social network;
   assigning an initial trust level to the broadcast account, wherein the initial trust level is chosen from a plurality of predefined trust levels, the predefined trust levels including a trust level associated with restricted broadcast privileges and a trust level associated with full broadcast privileges;
   determining a trust score for the broadcast account, wherein the trust score is based, at least in part, upon monitoring content broadcast by the user to identify copyright-infringing content included within the content broadcast by the user by comparing copyrighted content to the content broadcast by the user and one or more activities of the user, the one or more activities including a number of broadcasts that the user has made; and
   adjusting the initial trust level based, at least in part, upon the trust score, wherein adjusting the initial trust level includes:
      incrementing the initial trust level to a higher predefined trust level, chosen from a plurality of predefined trust levels, in response to a positive trust score, and
      decrementing the initial trust level to a lower predefined trust level, chosen from a plurality of predefined trust levels, in response to a negative trust score.

3. The computer-implemented method of claim 2 wherein establishing a broadcast account includes: requiring the user to confirm their identify.

4. The computer-implemented method of claim 3 wherein requiring the user to confirm their identity includes:
   confirming the identity of the user via bidirectional SMS communication.

5. The computer-implemented method of claim 2 wherein monitoring content broadcast by the user to determine the trust score further includes:
   identifying abusive content included within the content broadcast by the user.

6. The computer-implemented method of claim 2 wherein the one or more activities of the user include one or more activities of the user within the social network.

7. A computing system including a processor and memory configured to perform operations comprising:
   establishing a broadcast account for a user of an internet-based broadcasting system, wherein the internet-based broadcasting system is a portion of/included within a social network;
   assigning an initial trust level to the broadcast account, wherein the initial trust level is chosen from a plurality of predefined trust levels, the predefined trust levels including a trust level associated with restricted broadcast privileges and a trust level associated with full broadcast privileges;

determining a trust score for the broadcast account, wherein the trust score is based, at least in part, upon monitoring content broadcast by the user to identify copyright-infringing content included within the content broadcast by the user by comparing copyrighted content to the content broadcast by the user and one or more activities of the user, the one or more activities including a number of broadcasts that the user has made; and adjusting the initial trust level based, at least in part, upon the trust score, wherein adjusting the initial trust level includes:

incrementing the initial trust level to a higher predefined trust level, chosen from a plurality of predefined trust levels, in response to a positive trust score, and decrementing the initial trust level to a lower predefined trust level, chosen from a plurality of predefined trust levels, in response to a negative trust score.

8. The computing system of claim 7 wherein establishing a broadcast account includes:

requiring the user to confirm their identify.

9. The computing system of claim 8 wherein requiring the user to confirm their identity includes:

confirming the identity of the user via bidirectional SMS communication.

10. The computing system of claim 7 wherein monitoring content broadcast by the user to determine the trust score further includes:

identifying abusive content included within the content broadcast by the user.

11. The computing system of claim 7 wherein the one or more activities of the user include one or more activities of the user within the social network.

12. The computer-implemented method of claim 6 wherein the one or more activities of the user within the social network include a number of friends that the user has on the social network.

13. The computer-implemented method of claim 6 wherein the one or more activities of the user within the social network include a number of posts that the user has made on the social network.

14. The computing system of claim 11 wherein the one or more activities of the user within the social network include a number of friends that the user has within the social network.

15. The computing system of claim 11 wherein the one or more activities of the user within the social network include a number of posts that the user has made on the social network.

16. The non-transitory computer-readable medium of claim 1 wherein establishing a broadcast account includes requiring the user to confirm their identify.

17. The non-transitory computer-readable medium of claim 1 wherein requiring the user to confirm their identity includes confirming the identity of the user via bidirectional SMS communication.

18. The non-transitory computer-readable medium of claim 1 wherein monitoring content broadcast by the user to determine the trust score further includes identifying abusive content included within the content broadcast by the user.

19. The non-transitory computer-readable medium of claim 1 wherein the one or more activities of the user include one or more activities of the user within the social network.

20. The non-transitory computer-readable medium of claim 1 wherein the one or more activities of the user within the social network include a number of friends that the user has on the social network.

* * * * *